United States Patent
Chae et al.

(10) Patent No.: US 8,665,324 B2
(45) Date of Patent: Mar. 4, 2014

(54) STEREOSCOPIC IMAGE DISPLAY AND DRIVING METHOD THEREOF

(75) Inventors: Heeyoung Chae, Gyeonggi-do (KR); Seungchul Lee, Gyeonggi-do (KR); Heejin Im, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 526 days.

(21) Appl. No.: 12/963,783

(22) Filed: Dec. 9, 2010

(65) Prior Publication Data

US 2011/0216177 A1  Sep. 8, 2011

(30) Foreign Application Priority Data

Mar. 8, 2010 (KR) .......................... 10-2010-0020564

(51) Int. Cl.
*H04N 13/04* (2006.01)

(52) U.S. Cl.
USPC .............................................................. 348/57

(58) Field of Classification Search
None
See application file for complete search history.

(56) References Cited

U.S. PATENT DOCUMENTS

| | | | | |
|---|---|---|---|---|
| 2004/0183761 A1* | 9/2004 | Miyachi et al. | .................. | 345/87 |
| 2007/0008620 A1* | 1/2007 | Shestak et al. | ................ | 359/463 |
| 2007/0013774 A1* | 1/2007 | Maeng et al. | .................. | 348/87 |
| 2007/0019132 A1* | 1/2007 | Kim et al. | ........................ | 349/95 |
| 2008/0239485 A1* | 10/2008 | Kuroda et al. | ................ | 359/485 |
| 2008/0284801 A1* | 11/2008 | Brigham et al. | ............. | 345/690 |
| 2009/0091679 A1* | 4/2009 | Park et al. | ........................ | 349/48 |
| 2010/0045784 A1* | 2/2010 | Okazaki et al. | ................ | 348/55 |

\* cited by examiner

*Primary Examiner* — Joseph Ustaris
*Assistant Examiner* — Jill Sechser
(74) *Attorney, Agent, or Firm* — Morgan, Lewis & Bockius LLP

(57) ABSTRACT

Embodiments of this document provide a stereoscopic image display device and a driving method capable of preventing the reduction in resolution when 3D images are displayed on a stereoscopic image display device including a patterned retarder. According to an exemplary embodiment, in odd numbered display lines of a display panel, left eye image data input during an N-th (where N is a positive integer) frame period is displayed during the N-th frame period, and left eye compensation image data generated based on the data input during the N-th frame period is displayed during a (N+1)-th frame period, and in even numbered display lines of the display panel, right eye compensation image data generated based on data input during a (N−1)-th frame period is displayed during the N-th frame period, and right eye image data input during the (N+1)-th frame period is displayed during the (N+1)-th frame period.

8 Claims, 16 Drawing Sheets

STEREOSCOPIC IMAGE DISPLAY AND DRIVING METHOD THEREOF

This application claims the benefit of Korea Patent Application No. 10-2010-0020564 filed on Mar. 8, 2010, the entire contents of which is incorporated herein by reference for all purposes as if fully set forth herein.

BACKGROUND

1. Field

This document relates to a stereoscopic image display device and a driving method thereof.

2. Related Art

Stereoscopic image display devices implement stereoscopic images, that is, three-dimensional (3D) images using a stereoscopic technique and an autostereoscopic technique. The stereoscopic technique uses binocular parallax images which are great in the stereoscopic effect, and may have a type of using glasses and a type of not using glasses. In the type of using glasses ("glass type"), binocular parallax images are displayed on a direct view display panel or a projector by changing polarization directions or in the temporal division manner, and polarization glasses or liquid crystal shutter glasses are used to implement stereoscopic images. In the type of not using glasses ("glassless type"), the stereoscopic images are implemented by dividing optical axes of binocular parallax images, by using optical plates such as parallax barriers provided at front and rear surfaces of a display panel.

As an example of the glass type, there is a stereoscopic image display device where a patterned retarder is disposed on the display panel. The stereoscopic image display device implements 3D images by using polarization characteristics of the patterned retarder and polarization characteristics of polarization glasses which a user wears, and has excellent image quality as compared with other stereoscopic image implementation methods in that crosstalk in the left eye and the right eye is little and the brightness is good at the time of implementation of the 3D images.

However, the stereoscopic image display device using the patterned retarder has disadvantages in that it has lower brightness for two-dimensional (2D) images, up and down viewing angles smaller at the 3D images, and lower resolution by 50% or so than a typical 2D dedicated display device.

For example, the patterned retarder transmits only first polarization light rays of light rays for left eye images output from odd numbered display lines, whereas it transmits only second polarization light rays of light rays for right eye images output from even numbered display lines output. A user wearing the polarization glasses can view the first polarization light rays for left eye images displayed in the odd numbered lines through a left eye polarization filter of the polarization glasses and can view the second polarization light rays for right eye images displayed in even numbered lines through a right eye polarization filter thereof. Thus, as shown in FIG. 1, during an N-th (where N is a positive integer) frame period, if left eye images of 3D images are displayed in the odd numbered display lines LINE#1 and LINE#3 of the display panel and, during a (N+1)-th frame period, right eye images of the 3D images are displayed in the even numbered display lines LINE#2 and LINE#4, the user alternately views the left eye images and the right eye images of the 3D images at a half resolution as compared with the resolution of the display panel.

SUMMARY

Embodiments of this document provide a stereoscopic image display device and a driving method capable of preventing the reduction in resolution when 3D images are displayed on a stereoscopic image display device including a patterned retarder.

According to an exemplary embodiment, there is provided a stereoscopic image display device including a display panel provided with data lines and gate lines which intersect each other, and pixels arranged in a matrix; a patterned retarder including first retarders transmitting a first polarization light from odd numbered display lines of the display panel and second retarders transmitting a second polarization light from even numbered display lines; and polarization glasses including a first polarization filter transmitting the first polarization light from the first retarders and a second polarization filter transmitting the second polarization light from the second retarders.

In this case, in the odd numbered display lines of the display panel, left eye image data input during an N-th (where N is a positive integer) frame period is displayed during the N-th frame period, and left eye compensation image data generated based on the data input during the N-th frame period is displayed during a (N+1)-th frame.

Also, in the even numbered display lines, right eye compensation image data generated based on the data input during a (N−1)-th frame period is displayed during the N-th frame period, and right eye image data input during the (N+1)-th frame period is displayed during the (N+1)-th frame period.

According to an exemplary embodiment, there is provided a driving method including displaying left eye image data input during an N-th (where N is a positive integer) frame period in the odd numbered display lines of the display panel during the N-th frame period, and displaying right eye compensation image data generated based on the data input during a (N−1)-th frame period in the even numbered display lines of the display panel during the N-th frame period; and displaying left eye compensation image data generated based on the data input during the N-th frame period in the odd numbered display lines of the display panel during a (N+1)-th frame period and displaying right eye image data input during the (N+1)-th frame period in the even numbered display lines of the display panel during the (N+1)-th frame period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
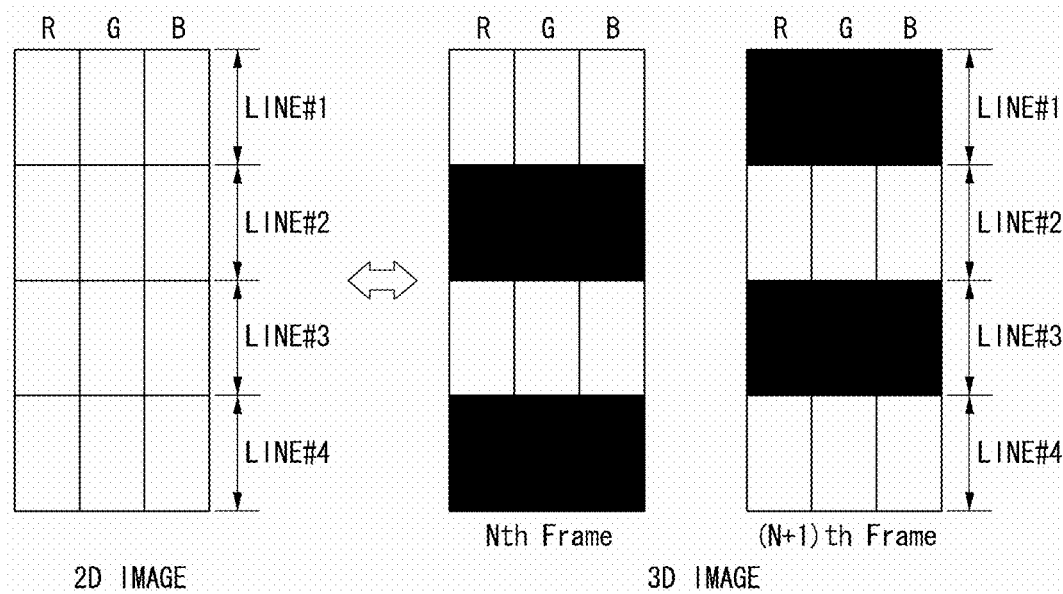
FIG. 1 is a diagram illustrating 3D image data input to pixels of a glass type stereoscopic image display device using a patterned retarder.

Hereinafter, embodiments of this document will be described in detail with reference to the accompanying drawings. Like reference numerals designate like elements throughout the specification. In the following description, when a detailed description of well-known functions or configurations related to this document is determined to unnecessarily cloud a gist of the present invention, the detailed description thereof will be omitted.

Names of the respective elements used in the following description are selected for convenience of writing the specification and may be thus different from those in actual products.

Figure 2:
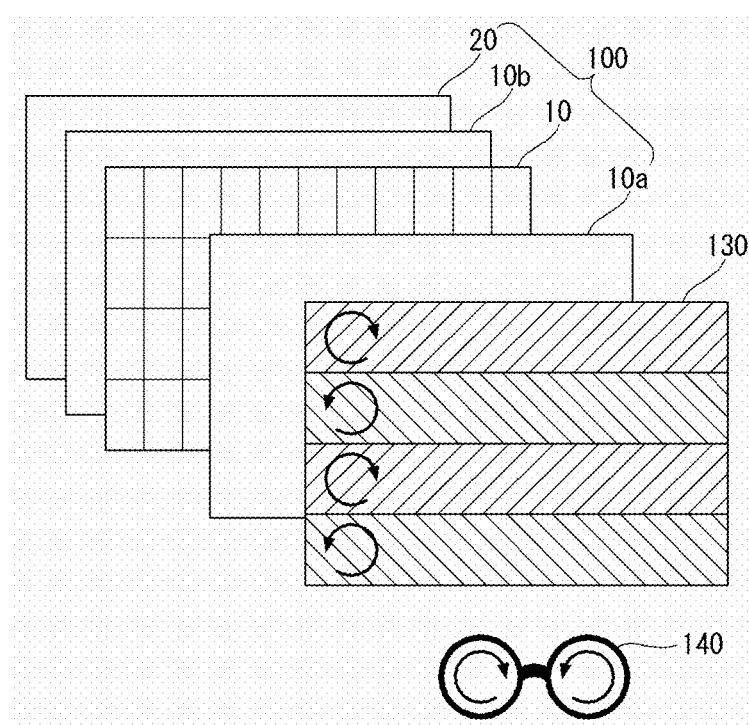
FIG. 2 is a diagram illustrating a configuration of a stereoscopic image display device according to an embodiment of this document.
Figure 3:
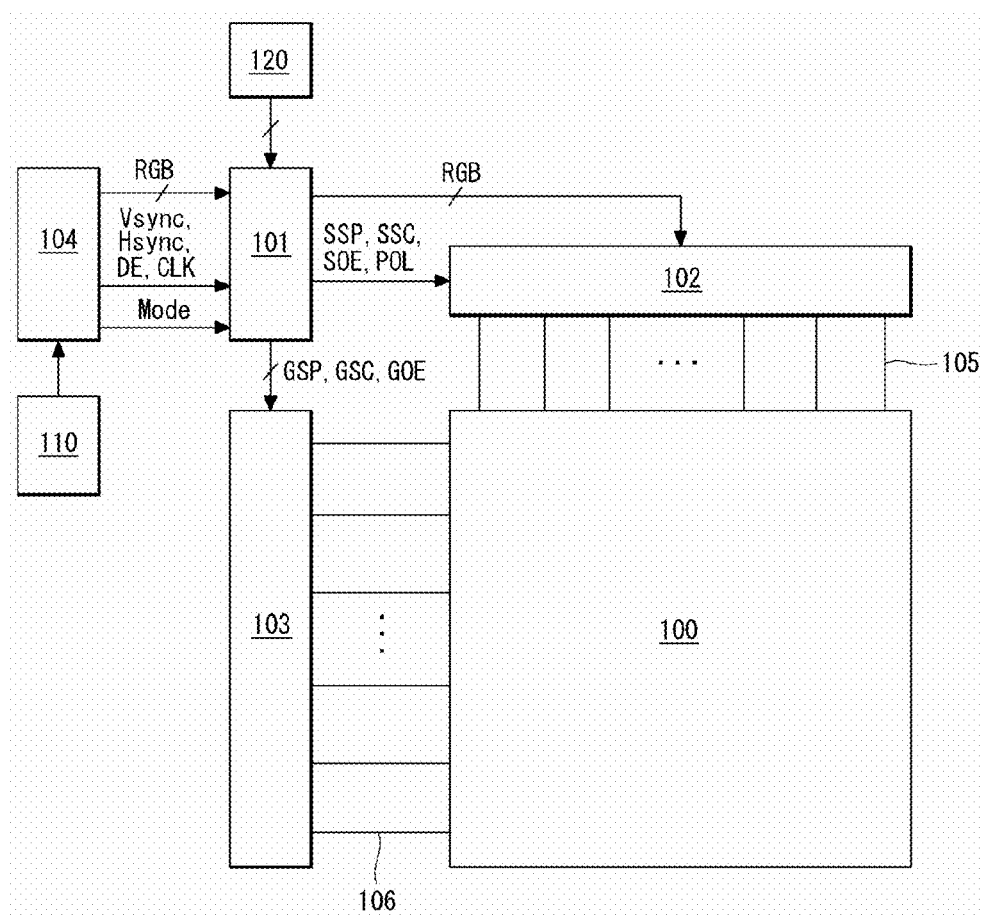
FIG. 3 is a block diagram illustrating a display panel and driving circuits thereof according to an embodiment of this document.

FIGS. 2 and 3 are diagram illustrating a stereoscopic image display device according to an embodiment of this document.

In FIGS. 2 and 3, the stereoscopic image display device includes a display panel 100, a patterned retarder 130, polarization glasses 140, and driving circuits 101 to 104 of the display panel.

The display panel 100 is a display device displaying 2D images and 3D images, and may be implemented by a flat display device such as a liquid crystal display (LCD), a field emission display (FED), a plasma display panel (PDP), an electroluminescence device (EL) including inorganic electroluminescence device and an organic light emitting diode (OLED) display, an electrophoresis display (EPD), or the like. The embodiments of this document will be described by exemplifying the LCD.

The display panel 100 is provided with two glass substrates with a liquid crystal layer interposed between the two glass substrates. The display panel 100 includes liquid crystal cells arranged in a matrix at the intersections of data lines 105 and gate lines 106.

Figure 4:
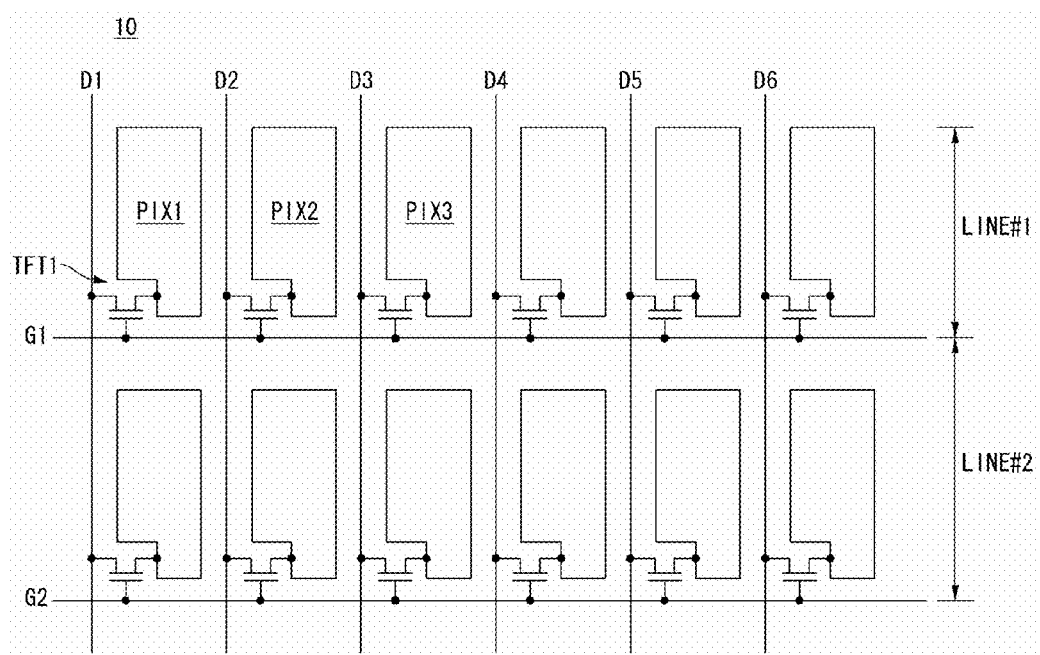
FIG. 4 is a circuit diagram illustrating a pixel array of the display panel according to a first embodiment of this document.
Figure 6:
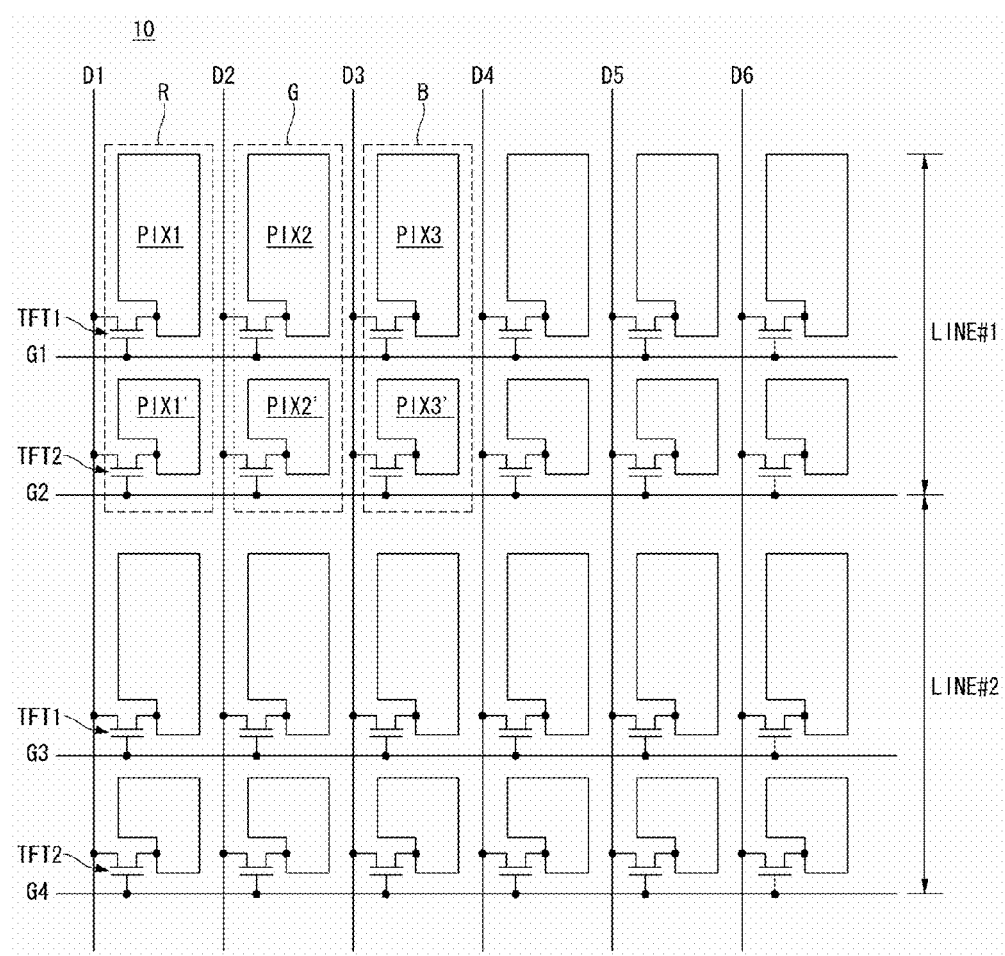
FIG. 6 is a circuit diagram illustrating a pixel array of the display panel according to a second embodiment of this document.

The lower glass substrate of the display panel 100 is provided with a pixel array 10 including the data lines 105, the gate lines 106, thin film transistors (TFTs), pixel electrodes, and storage capacitors Cst. The pixel array 10 of the display panel may be implemented as shown in FIGS. 4 and 6. The liquid crystal cells are driven by electric fields generated between the pixel electrodes connected to the TFTs and common electrodes. The upper glass substrate of the display panel 100 is provided with black matrices, color filters, and the common electrodes. Polarization films 10a and 10b are respectively attached to the outer surfaces of the lower and upper glass substrate of the display panel 100, and alignment layers are formed on the inner surfaces having contact with the liquid crystal layer to set pretilt angles of the liquid crystal layer.

The common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Spacers are disposed between the upper glass substrate and the lower glass substrate so as to the cell gap of the liquid crystal cells.

The display panel 100 may be implemented by a liquid crystal display panel of any other type as well as liquid crystal display panels of the TN mode, the VA mode, the IPS mode, and the FFS mode. The LCD according to this document may be implemented by any other type, for example, such as a transmissive LCD, a transflective LCD, a reflective LCD, or the like. The transmissive LCD and the transflective LCD require a backlight unit. The backlight unit may be implemented by a direct type backlight unit or an edge type backlight unit.

The patterned retarder 130 is attached onto the upper polarization film 10a of the display panel 100. First retarders are formed in odd numbered display lines of the patterned retarder 130 and second retarders are formed in even numbered display lines of the patterned retarder 130. Light absorption axes of the first retarder and second retarder are different from each other. The first retarders of the patterned retarder 130 correspond to the odd numbered display lines of the pixel array 10 and transmit first polarization light (circularly polarized light or linearly polarized light) for light output from the odd numbered display lines of the pixel array 10. The second retarders of the patterned retarder 130 correspond to the even numbered display lines of the pixel array 10 and transmit second polarization light (circularly polarized light or linearly polarized light) for light output from the even numbered display lines of the pixel array 10. The first retarder of the patterned retarder 130 may be implemented by a polarization filter transmitting left circularly polarized light and the second retarder of the patterned retarder 130 may be implemented by a polarization filter transmitting right circularly polarized light.

A left eye polarization filter (or a first polarization filter) of polarization glasses 140 has the same light absorption axis as the first retarder of the patterned retarder 130. A right eye polarization filter (or a second polarization filter) of the polarization glasses 140 has the same light absorption axis as the second retarder of the patterned retarder 130. For example, the left eye polarization filter of the polarization glasses 140 may employ a left-circled polarization filter and the right eye polarization filter of the polarization glasses 140 may employ a right-circled polarization filter. A user can view 3D images displayed on the stereoscopic image display device.

The driving circuits 101 to 104 of the display panel 100 include a data driving circuit 102, a gate driving circuit 103, a resolution conversion unit 120, a timing controller 101.

Each of source drive ICs of the data driving circuit 102 includes a shift register, a latch, a digital to analog converter (DAC), an output buffer, and so forth. The data driving circuit 102 latches digital video data under the control of the timing controller 101. The data driving circuit 102 converts the digital video data RGB into analog positive gamma compensation voltages and analog negative gamma compensation voltages in response to a polarity control signal POL and in turn reverses the polarities of the data voltages. The data driving circuit 102 outputs data voltages synchronized with gate pulses output from the gate driving circuit 103, to the data lines 105. The source drive ICs of the data driving circuit 102 may be mounted on a TCP (tape carrier package) and be joined to the lower glass substrate of the display panel 100 through a TAB (tape automated bonding) process.

The data driving circuit 102 outputs, in the 2D mode, data voltages for 2D images of which left eye images and right eye images are not differentiated from each other. The data driving circuit 102 supplies, in the 3D mode, data voltages for left eye images and data voltages for right eye images to the data lines 105 as shown in FIGS. 10A to 11B.

The gate driving circuit 103 includes a shift register, a level shifter, and so on. The gate driving circuit 103 sequentially supplies gate pulses (or scan pulses) to the gate lines 106 under the control of the timing controller 101. The gate driving circuit 103 may be mounted on a TCP and be joined to the lower glass substrate of the display panel 100 through the TAB process, or may be directly formed on the lower glass substrate along with the pixel array 10 through a GIP (gate in panel) process.

The resolution conversion unit 120 performs a horizontal scaling process for input images in the 3D mode, interpolates the input images by inserting left eye image data and right eye image data between two neighboring left eye image data and right eye image data, and thus increases the resolution of the input images to two times. Meanwhile, the resolution conversion unit may be implemented as a resolution converter. The resolution conversion unit 120 may be connected to the timing controller 101, may be disposed between the system board 104 and the timing controller 101, or may be disposed between the timing controller 101 and the data driving circuit 102. For this, the resolution conversion unit 120 may include a line memory and a resolution conversion module. In the example shown in FIG. 3, the resolution conversion unit 120 increases the resolution of the 3D image data output from the timing controller 101 and supplies the resolution-increased 3D image data to the timing controller 101. The timing controller 101 receives the resolution-increased 3D image data from the resolution conversion unit 120 and supplies it to the data driving circuit 102. The resolution conversion unit 120 does not need a frame memory. The resolution conversion unit 120 may be embedded in the system board 104 and convert in advance a resolution of 3D image data which will be input to the timing controller 101.

The timing controller 101 receives timing signals such as a vertical synchronization signal Vsync, a horizontal synchronization signal Hsync, a data enable signal DE, and dot clocks CLK from the system board 104, and generates control signals for controlling operation timings of the data driving circuit 102, the gate driving circuit 103, and the resolution conversion unit 120. The control signals includes gate timing control signals for controlling operation timings of the gate driving circuit 103, and data timing control signals for controlling operation timings of the data driving circuit 102 and polarities of the data voltages. The timing controller 101 may determine 2D or 3D mode by receiving a mode signal Mode from the system board 104.

Timing controller 101 may transmit data for 2D images to the data driving circuit 102 at an input frame frequency or a frame frequency of the multiple i (where i is an integer more than 2) of input frame frequency in the 2D mode. The input frame frequency is 60 Hz in the NTSC (National Television Standard Committee) system and 50 Hz in the PAL (Phase-Alternating Line) system. The timing controller 101 may transmit data for 3D images to the data driving circuit 102 at a frame frequency of the multiple i of the input frame frequency in the 3D mode. In the following description, the frame frequency in the 3D mode is described as 120 Hz, but is not limited thereto, and it is noted that the frame frequency in the 3D mode may be 100 Hz, 150 Hz, 180 Hz, 200 Hz, 240 Hz, and so on, as well as 120 Hz.

The gate timing control signals include a gate start pulse GSP, gate shift clocks GSC, a gate output enable signal GOE, and so forth. The gate start pulse GSP is generated once during one frame period when the frame period starts and is applied to a gate drive IC generating a first gate pulse so as to enable the gate drive IC to generate the first gate pulse. The gate shift clocks GSC are clock signals which are commonly input to the gate drive ICs and are used as clock signals for shifting the gate start pulse GSP. The gate output enable signal GOE controls output timings of the gate driving circuit.

The data timing control signals include a source start pulse SSP, a source sampling clock SSC, a polarity control signal POL a source output enable signal SOE, and so on. The source start pulse SSP controls data sampling start timings in the data driving circuit. The source sampling clock SSC is a clock signal which controls data sampling timings with respect to a rising edge or a falling edge in the data driving circuit 102. The polarity control signal POL controls polarities of the data voltages output from the data driving circuit 102. The source output enable signal SOE controls output timings of the data driving circuit 102. If the digital video data to be input to the data driving circuit 102 is transmitted by a mini LVDS interface specification, the source start pulse SSP and the source sampling clock SSC may be omitted.

The system board 104 supplies the 2D images or 3D images and the timing signals Vsync, Hsync, DE and CLK, to the controller 101 via an interface such as an LVDS (low voltage differential signaling) interface or a TMDS (transition minimized differential signaling) interface. The system board 104 supplies the mode signal Mode indicating the 2D mode and the 3D mode to the timing controller 101 and the gate driving circuit 103. The system board 104 supplies 2D image data to the timing controller 101 in the 2D mode, and supplies 3D image data including left eye images and right eye images to the timing controller 101 in the 3D mode.

A user can select the 2D mode and the 3D mode through a user interface 110. The user interface 110 includes a touch screen attached onto or embedded in the display panel 100, an OSD (on-screen display), a keyboard, a mouse, a remote controller, or the like.

The system board 104 switches a 2D mode operation and a 3D mode operation in response to user data input through the user interface 110. The system board 104 may differentiate the 2D mode from the 3D mode by detecting 2D/3D identification code encoded in data for the input images, for example, a 2D/3D identification code which can be coded in an EPG (electronic program guide) or an ESG (electronic service guide) of a digital broadcasting standard.

Figure 5A:
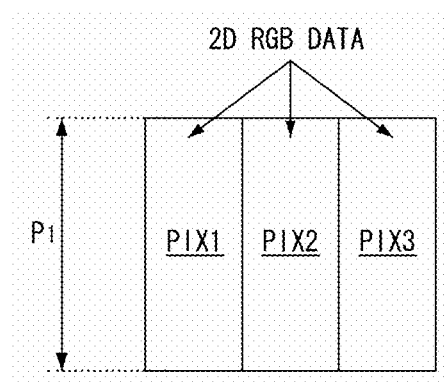
FIGS. 5A and 5B are diagrams illustrating 2D image data and 3D image data written in pixels of the pixel array shown in FIG. 4.
Figure 5B:
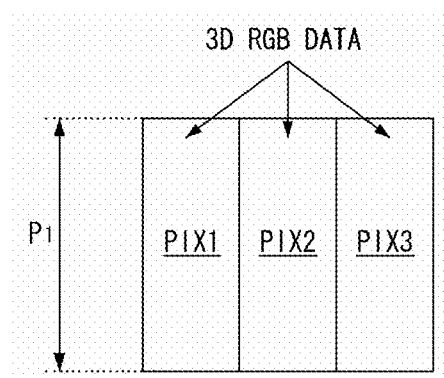

FIG. 4 is a circuit diagram illustrating the pixel array 10 of the display panel 100 according to a first embodiment of this document. FIGS. 5A and 5B are diagrams illustrating 2D image data and 3D image data written in the pixels of the pixel array shown in FIG. 4.

In FIG. 4, the pixel array 10 of the display panel 100 includes m×n pixels (where m and n are positive integers). Each of pixels includes a liquid crystal cell of a red sub-pixel R, a liquid crystal cell of a green sub-pixel G, and a liquid crystal cell of a green sub-pixel B.

The sub-pixels respectively include pixel electrodes PIX1 to PIX3 and TFTs TFT1. The TFTs TFT1 supply the data voltages from the data lines D1 to D6 to the pixel electrodes PIX1 to PIX3 in response to the gate pulses from the gate lines G1 and G2. Gate terminals of the TFTs TFT1 are connected to the gate lines G1 and G2. Drain terminals of the TFTs TFT1 are connected to the data lines D1 to D6, and source terminals thereof are connected to the pixel electrodes PIX1 to PIX3.

The 2D image data as shown in FIG. 5A is written in the pixels of the pixel array 10 shown in FIG. 4 in the 2D mode, and the 3D image data as shown in FIG. 5B is written in the pixels in the 3D mode.

Figure 7A:
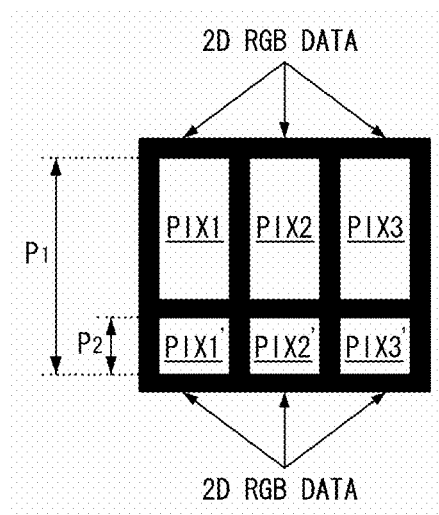
FIGS. 7A and 7B are diagrams illustrating 2D image data and 3D image data written in the pixels of the pixel array shown in FIG. 6.
Figure 7B:
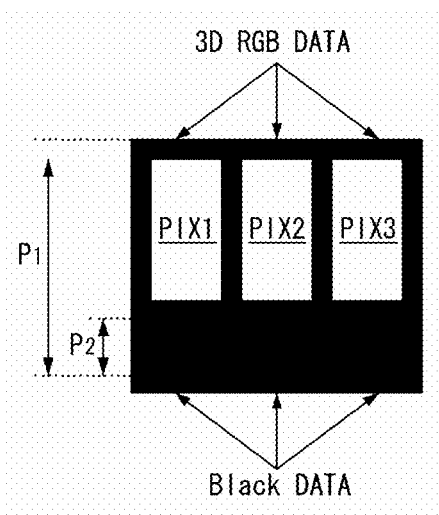

FIG. 6 is a circuit diagram illustrating the pixel array 10 of the display panel 100 according to a second embodiment of this document. FIGS. 7A and 7B are diagrams illustrating 2D image data and 3D image data written in the pixels of the pixel array 10 shown in FIG. 6.

In FIG. 6, the pixel array 10 of the display panel 100 includes m×n pixels (where m and n are positive integers). Each of pixels includes a liquid crystal cell of a red sub-pixel, a liquid crystal cell of a green sub-pixel, and a liquid crystal cell of a green sub-pixel. Each of the sub-pixels includes a main sub-pixel and an auxiliary sub-pixel.

The main sub-pixels include main pixel electrodes PIX1 to PIX3 and first TFTs TFT1. The first TFTs TFT1 supply the data voltages from the data lines D1 to D6 to the main pixel electrodes PIX1 to PIX3 in response to the gate pulses from the odd numbered gate lines G1 and G3. Gate terminals of the first TFTs TFT1 are connected to the odd numbered gate lines G1 and G3. Drain terminals of the first TFTs TFT1 are connected to the data lines D1 to D6, and source terminals thereof are connected to the main pixel electrodes PIX1 to PIX3.

The auxiliary sub-pixels include auxiliary pixel electrodes PIX1' to PIX3' and second TFTs TFT2. The second TFTs TFT2 supply the data voltages from the data lines D1 to D6 to the auxiliary pixel electrodes PIX1' to PIX3' in response to the gate pulses from the even numbered gate lines G2 and G4. Gate terminals of the second TFTs TFT2 are connected to the even numbered gate lines G2 and G4. Drain terminals of the second TFTs TFT2 are connected to the data lines D1 to D6, and source terminals thereof are connected to the auxiliary pixel electrodes PIX1' to PIX3'.

The auxiliary sub-pixels charge the red, green, and blue data voltages for the 2D images therein in the 2D mode as shown in FIG. 7A, and heighten brightness and chromaticity of the 2D images to improve display quality of the 2D images. Also, the auxiliary sub-pixels charge black data voltage therein in the 3D mode as shown in FIG. 7B, and function as active black stripes for increasing up and down viewing angles of the stereoscopic image display device.

The up and down viewing angles for the 3D images are proportional to a ratio $\{(P2*100)/P1\}$ of the vertical pitch P2 of the auxiliary sub-pixel to the vertical pitch P1 of the main sub-pixel, whereas the brightness for the 3D images is inversely proportional to the ratio $\{(P2*100)/P1\}$. Therefore, it is necessary to appropriately design the vertical pitch P1 of the main sub-pixels and the vertical pitch P2 of the auxiliary sub-pixels in consideration of the up and down viewing angles for the 3D images and the brightness for the 3D images, and the vertical pitch P2 of the auxiliary sub-pixels is made lower than the vertical pitch P1 of the main sub-pixels.

Figure 8:
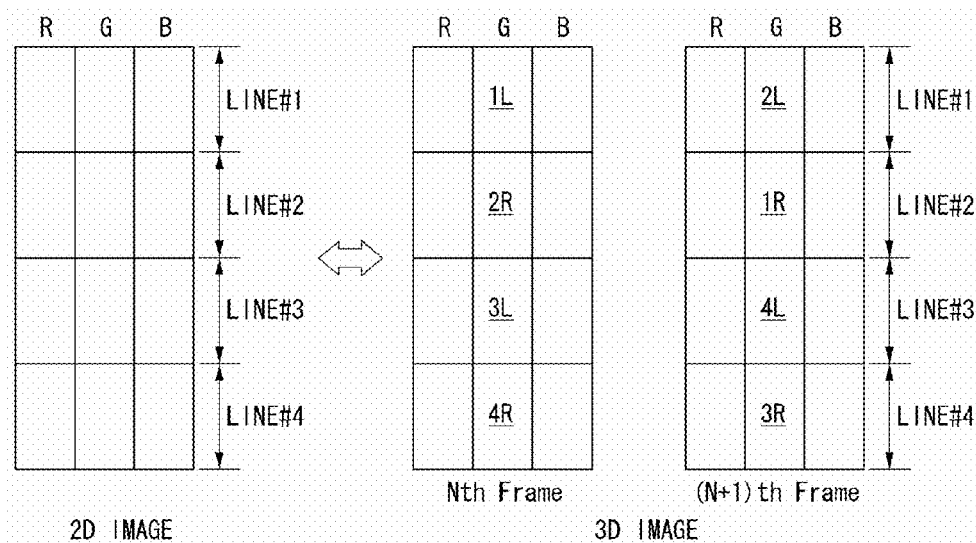
FIG. 8 is a diagram illustrating an example of 3D image data written in the pixels of the pixel array in this document.

FIG. 8 is a diagram illustrating an example of 3D image data written in the pixel array in this document.

Referring to FIG. 8, the left eye image data 1L and 3L of the 3D images is written in the pixels belonging to the odd numbered display lines LINE#1 and LINE#3 of the pixel array 10 during an N-th (where N is a positive integer) frame period, and the right eye image data 2R and 4R of the 3D images is written in the pixels belonging to the even numbered display lines LINE#2 and LINE#4 of the pixel array 10 during the N-th frame period. Then, the left eye image data 2L and 4L of the 3D images is written in the pixels belonging to the odd numbered display lines LINE#1 and LINE#3 of the pixel array 10 during the (N+1)-th frame period, and the right eye image data 1R and 3R of the 3D images is written in the pixels belonging to the odd numbered display lines LINE#1 and LINE#3 of the pixel array 10 during the (N+1)-th frame period.

Data for images input in the 3D mode (3D input images) includes only left eye image data for the odd numbered display lines during the N-th frame period and includes only the right eye image data for the even numbered display lines during the (N+1)-th frame period, as shown in FIG. 1. In FIG. 8, the 3D input image data includes data "1L," "3L," "1R," and "3R" but does not include other data 2R, 4R, 2L, and 4L. Here, the data 1L indicates left eye image data written in the first display line LINE#1 of the pixel array 10 among the 3D images input during the N-th frame period, and the data 3L indicates left eye image data displayed in the third display line LINE#3 of the pixel array 10 among the 3D images input during the N-th frame period. The data 1R indicates right eye image data displayed in the second display line LINE#2 of the pixel array 10 among the 3D images input during the (N+1)-th frame period, and the data 3R indicates right eye image data displayed in the fourth display lines LINE#4 of the pixel array 10 among the 3D images input during the (N+1)-th frame period.

The resolution conversion unit 120 generates the data "2R," "4R," "2L," and "4L" shown in FIG. 8 based on the 3D input image data, by using the well-known signal interpolation method. The data 2R is right eye compensation image data which is calculated as an average value of plural pieces of data for display lines adjacent to the second display line LINE#2 among the 3D images input during a (N−1)-th frame period, and is written in the pixels in the second display line LINE#2 during the N-th frame period. The data 4R is right eye compensation image data which is calculated as an average value of plural pieces of data for display lines adjacent to the fourth display lines LINE#4 among the 3D images input during the (N−1)-th frame period, and is written in the fourth display lines LINE#4 during the N-th frame period. The data 2L is left eye compensation image data which is calculated as an average value of plural pieces of data for display lines adjacent to the second display line LINE#2 during the N-th frame period and is written in the first display line LINE#1 during the (N+1)-th frame period. The data 4L is left eye compensation image data which is calculated as an average value of plural pieces of data for display lines adjacent to the fourth display line LINE#4 among the 3D images input during N-th frame period and is written in the third display line LINE#3.

A user can view the left eye image data 1L and 3L displayed in the odd numbered display lines LINE#1 and LINE#3 of the pixel array 10 and the right eye image data 2R and 4R displayed in the even numbered display lines LINE#2 and LINE#4 of the pixel array 10 at the same time during the N-th frame period. Here, light from the odd numbered display lines LINE#1 and LINE#3 where the left eye image data 1L and 3L is displayed is transmitted through the first retarders of the patterned retarder 130 and the left eye polarization filter of the polarization glasses 140 and enters the user's left eye. Light from the even numbered display lines LINE#2 and LINE#4 where the right eye image data 2R and 4R is transmitted through the second retarders of the patterned retarder 130 and the right eye polarization filter of the polarization glasses 140 and enters the user's right eye.

Next, the user can view the left eye image data 2L and 4L displayed in the odd numbered display lines LINE#1 and LINE#3 of the pixel array 10 and the right eye image data 1R and 3R displayed in the even numbered display lines LINE#2 and LINE#4 of the pixel array 10 at the same time during the (N+1)-th frame period. Here, light from the odd numbered display lines LINE#1 and LINE#3 where the left eye image data 2L and 4L is displayed is transmitted through the first retarders of the patterned retarder 130 and the left eye polarization filter of the polarization glasses 140 and enters the user's left eye. Light from the even numbered display lines LINE#2 and LINE#4 where the right eye image data 1R and 3R is transmitted through the second retarders of the patterned retarder 130 and the right eye polarization filter of the polarization glasses 140 and enters the user's right eye.

Figure 9:
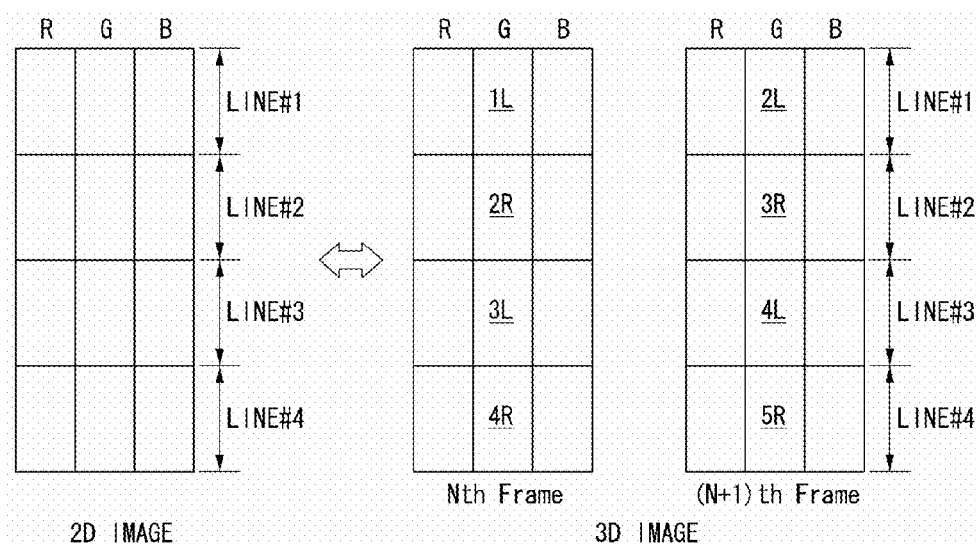
FIG. 9 is a diagram illustrating another example of 3D image data written in the pixels of the pixel array in this document.

FIG. 9 is a diagram illustrating another example of 3D image data written in the pixels of the pixel array in this document.

Referring to FIG. 9, the left eye image data 1L and 3L of the 3D images is written in the pixels belonging to the odd numbered display lines LINE#1 and LINE#3 of the pixel array 10 during the N-th frame period, and the right eye image data 2R and 4R of the 3D images is written in the pixels belonging to the even numbered display lines LINE#2 and LINE#4 of the pixel array 10 during the N-th frame period. Then, the left eye image data 2L and 4L of the 3D images is written in the pixels belonging in the odd numbered display lines LINE#1 and LINE#3 of the pixel array 10 during the (N+1)-th frame period, and the right eye image data 3R and 5R of the 3D images is written in the pixels belonging to the odd numbered display lines LINE#1 and LINE#3 of the pixel array 10 during the (N+1)-th frame period.

Data for images input in the 3D mode (3D input images) includes only left eye image data for the odd numbered display lines during the N-th frame period and includes only the right eye image data for the even numbered display lines during the (N+1)-th frame period, as shown in FIG. 1. In FIG. 9, the 3D input image data includes data "1L," "3L," "3R," and "5R" but does not include other data 2R, 4R, 2L, and 4L. Here, the data 1L indicates left eye image data displayed in the first display line LINE#1 of the pixel array 10 among the 3D images input during the N-th frame period, and the data 3L indicates left eye image data displayed in the third display line LINE#3 of the pixel array 10 among the 3D images input during the N-th frame period. Among the 3D images input during the (N+1)-th frame period, right eye image data to be displayed in the second display line LINE#2 of the pixel array 10 is discarded by the resolution conversion unit 120, and, instead, the right eye image data 3R for the next line is inserted into the position. Therefore, the data 3R indicates right eye image data displayed in the second display line LINE#2 of the pixel array 10 among the 3D images input during the (N+1)-th frame period, and the data 5R indicates right eye image data displayed in the fourth display lines LINE#4 of the pixel array 10 among the 3D images input during the (N+1)-th frame period.

The resolution conversion unit 120 generates the data "2R," "4R," "2L," and "4L" shown in FIG. 9 based on the 3D input image data, by using the well-known signal interpolation method. The data 2R is right eye compensation image data which is calculated as an average value of plural pieces of data for display lines adjacent to the second display line LINE#2 among the 3D images input during a (N−1)-th frame period, and is written in the pixels in the second display line LINE#2 during the N-th frame period. The data 4R is right eye compensation image data which is calculated as an average value of plural pieces of data for display lines adjacent to the fourth display lines LINE#4 among the 3D images input during the (N−1)-th frame period, and is written in the fourth display lines LINE#4 during the N-th frame period. The data 2L is left eye compensation image data which is calculated as an average value of plural pieces of data for display lines adjacent to the second display line LINE#2 during the N-th frame period and is written in the first display line LINE#1 during the (N+1)-th frame period. The data 4L is left eye compensation image data which is calculated as an average value of plural pieces of data for display lines adjacent to the third display line LINE#4 among the 3D images input during N-th frame period and is written in the third display line LINE#3.

The user can view the left eye image data 1L and 3L displayed in the odd numbered display lines LINE#1 and LINE#3 of the pixel array 10 and the right eye image data 2R and 4R displayed in the even numbered display lines LINE#2 and LINE#4 of the pixel array 10 at the same time during the N-th frame period. Here, light from the odd numbered display lines LINE#1 and LINE#3 where the left eye image data 1L and 3L is displayed is transmitted through the first retarders of the patterned retarder 130 and the left eye polarization filter of the polarization glasses 140 and enters the user's left eye. Light from the even numbered display lines LINE#2 and LINE#4 where the right eye image data 2R and 4R is transmitted through the second retarders of the patterned retarder 130 and the right eye polarization filter of the polarization glasses 140 and enters the user's right eye.

Next, the user can view the left eye image data 2L and 4L displayed in the odd numbered display lines LINE#1 and LINE#3 of the pixel array 10 and the right eye image data 3R and 5R displayed in the even numbered display lines LINE#2 and LINE#4 of the pixel array 10 at the same time during the (N+1)-th frame period. Here, light from the odd numbered display lines LINE#1 and LINE#3 where the left eye image data 2L and 4L is displayed is transmitted through the first retarders of the patterned retarder 130 and the left eye polarization filter of the polarization glasses 140 and enters the user's left eye. Light from the even numbered display lines LINE#2 and LINE#4 where the right eye image data 3R and 5R is transmitted through the second retarders of the patterned retarder 130 and the right eye polarization filter of the polarization glasses 140 and enters the user's right eye.

Figure 10A:
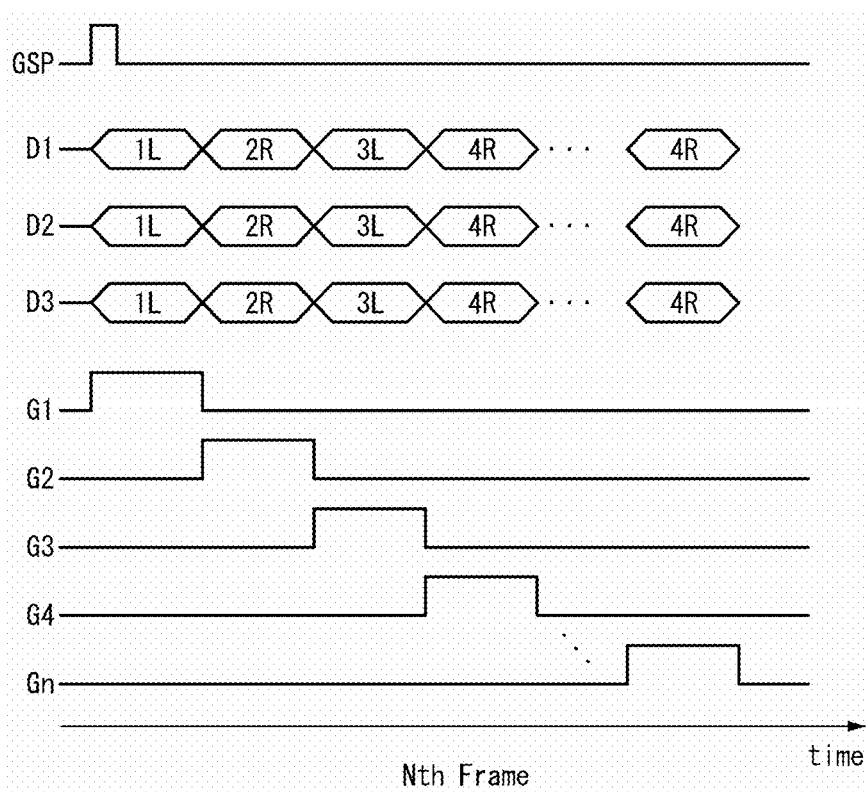
FIGS. 10A and 10B are waveform diagrams illustrating 3D image data and gate pulses written in the pixels of the pixel array shown in FIG. 4.
Figure 10B:
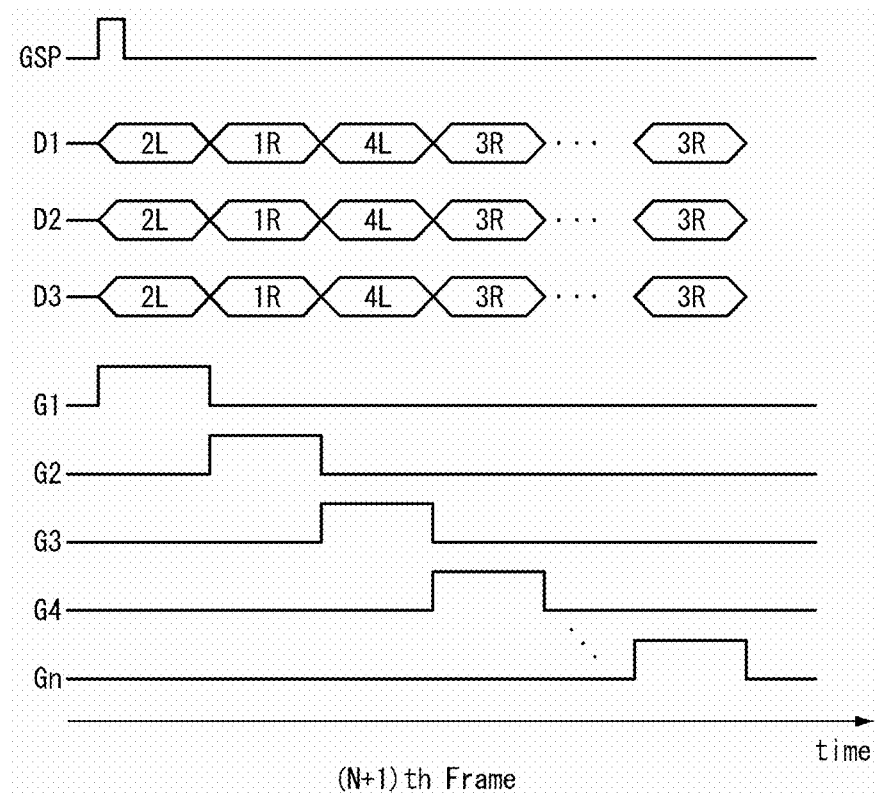

FIGS. 10A and 10B are waveform diagrams illustrating the 3D input images in FIG. 8 written in the pixels of the pixel array 10 shown in FIG. 4 and gate pulses. In FIGS. 10A and 10B, the reference numeral GSP denotes a gate start pulse, and the reference numerals D1 to D3 denote data lines 105. The reference numerals G1 to Gn denote gate pulses.

In FIGS. 10A and 10B, the data driving circuit 102 supplies data voltages to the data lines D1 to D3 in an order of the left eye image data 1L, the right eye image data 2R, the left eye image data 3L, and the right eye image data 4R synchronized with the gate pulses during the N-th frame period. Then, the data driving circuit 102 supplies data voltages to the data lines D1 to D3 in an order of the left eye image data 2L, the right eye image data 1R, the left eye image data 4L, and the right eye image data 3R synchronized with the gate pulses during (N+1)-th frame period.

Figure 11A:
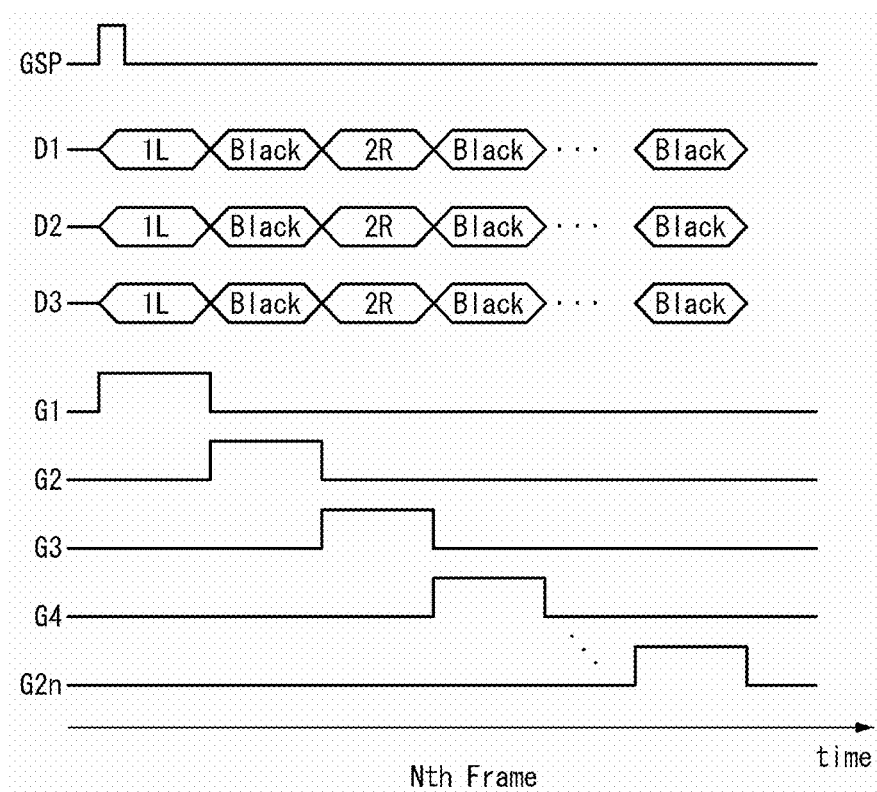
FIGS. 11A and 11B are waveform diagrams illustrating 3D image data and gate pulses written in the pixels of the pixel array shown in FIG. 6.
Figure 11B:
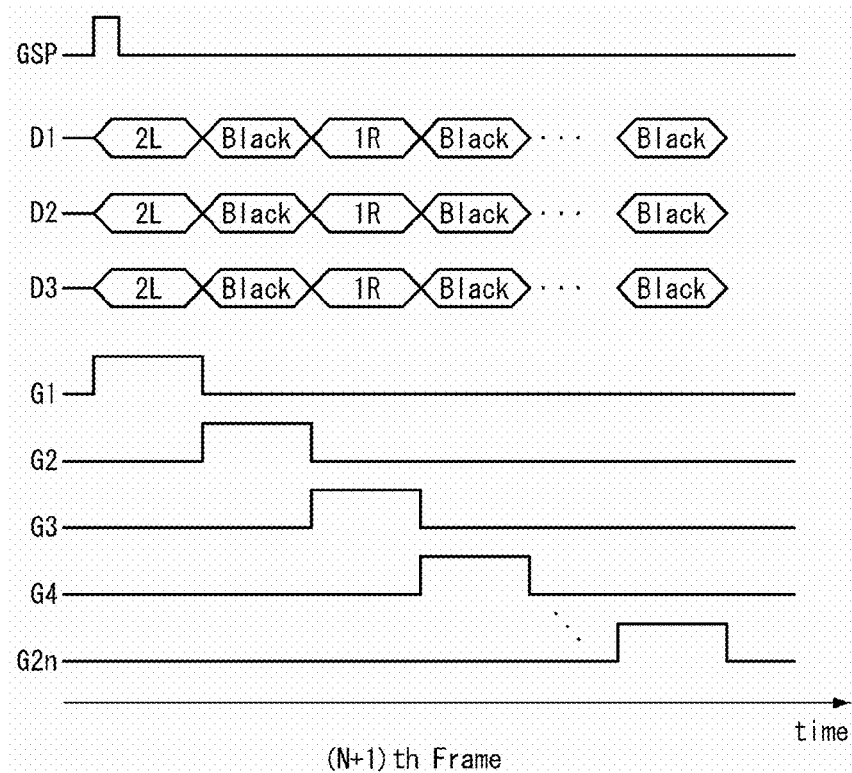

FIGS. 11A and 11B are waveform diagrams illustrating the 3D input images in FIG. 8 written in the pixels of the pixel array 10 shown in FIG. 6 and gate pulses. In FIGS. 11A and 11B, the reference numeral GSP denotes a gate start pulse, and the reference numerals D1 to D3 denote data lines 105. The reference numerals G1 to G2$n$ denote gate pulses.

In FIGS. 11A and 11B, the data driving circuit 102 supplies data voltages to the data lines D1 to D3 in an order of the left eye image data 1L, black data, the right eye image data 2R, the black data, the left eye image data 3L, the black data, the right eye image data 4R, and the black data synchronized with the gate pulses during the N-th frame period. Then, the data driving circuit 102 supplies data voltages to the data lines D1 to D3 in an order of the left eye image data 2L, the black data, the right eye image data 1R, the black data, the left eye image data 4L, the black data, the right eye image data 3R, and black data synchronized with the gate pulses during (N+1)-th frame period.

In FIGS. 11A and 11B, the left and right eye image data is written in the main sub-pixels shown in FIG. 6, and the black data which is data having a black grayscale value is written in the auxiliary sub-pixels shown in FIG. 6. The black data is inserted between the left eye image data and the right eye image data by the resolution conversion unit 120 or the timing controller 101.

In the case of the 3D image data in FIG. 9, the right eye image data 1R and 3R in the waveform diagrams in FIGS. 10B and 11B is replaced with the right eye image data 3R and 5R.

Figure 12:
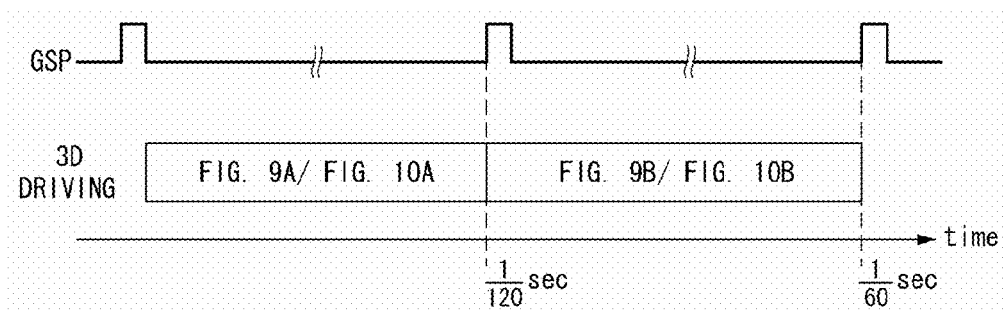
FIG. 12 shows that the stereoscopic image display device according to the embodiment of this document is driven at a frame frequency of 120 Hz.

If the stereoscopic image display device in this document is driven at 120 Hz in the 3D mode, a time corresponding to each of the N-th frame period and (N+1)-th frame period is 1/120 Hz, that is, about 8.33 msec, as shown in FIG. 12.

Figure 13:
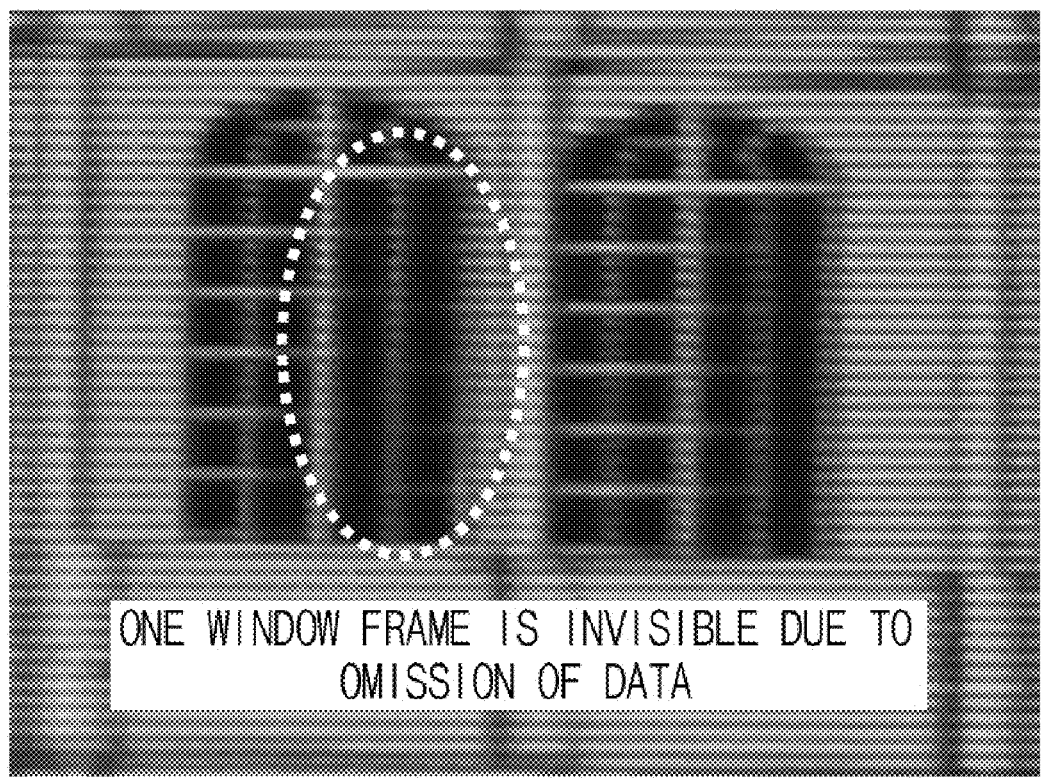
FIGS. 13 and 14 are diagrams illustrating test results of low resolution 3D image as shown in FIG. 1.
Figure 14:
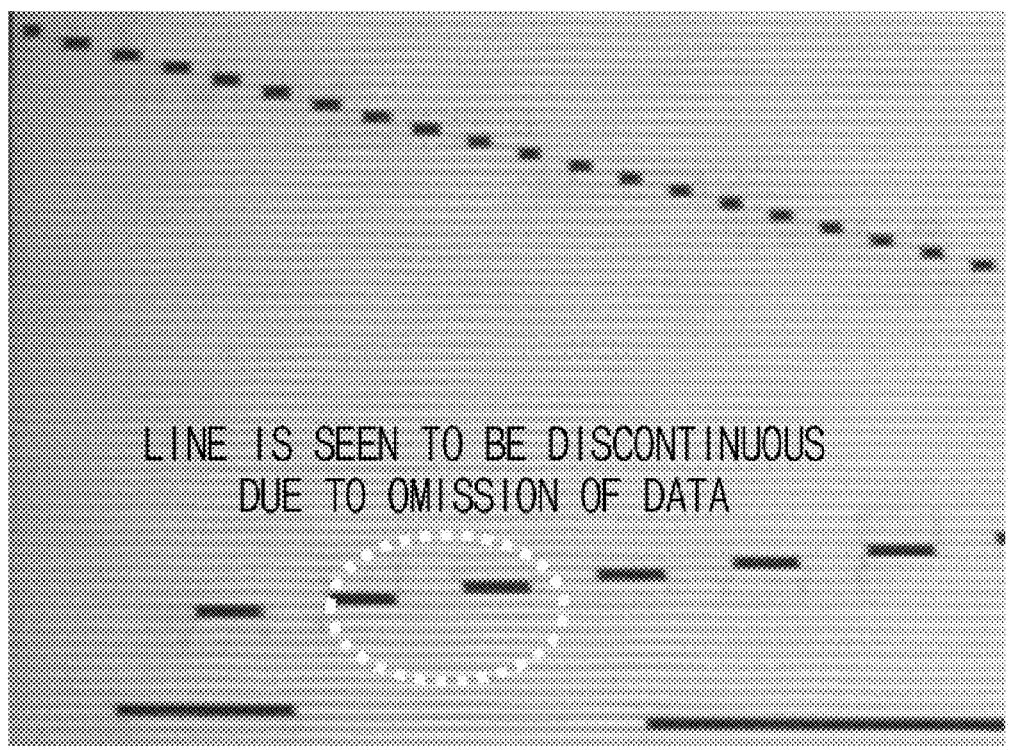
Figure 15:
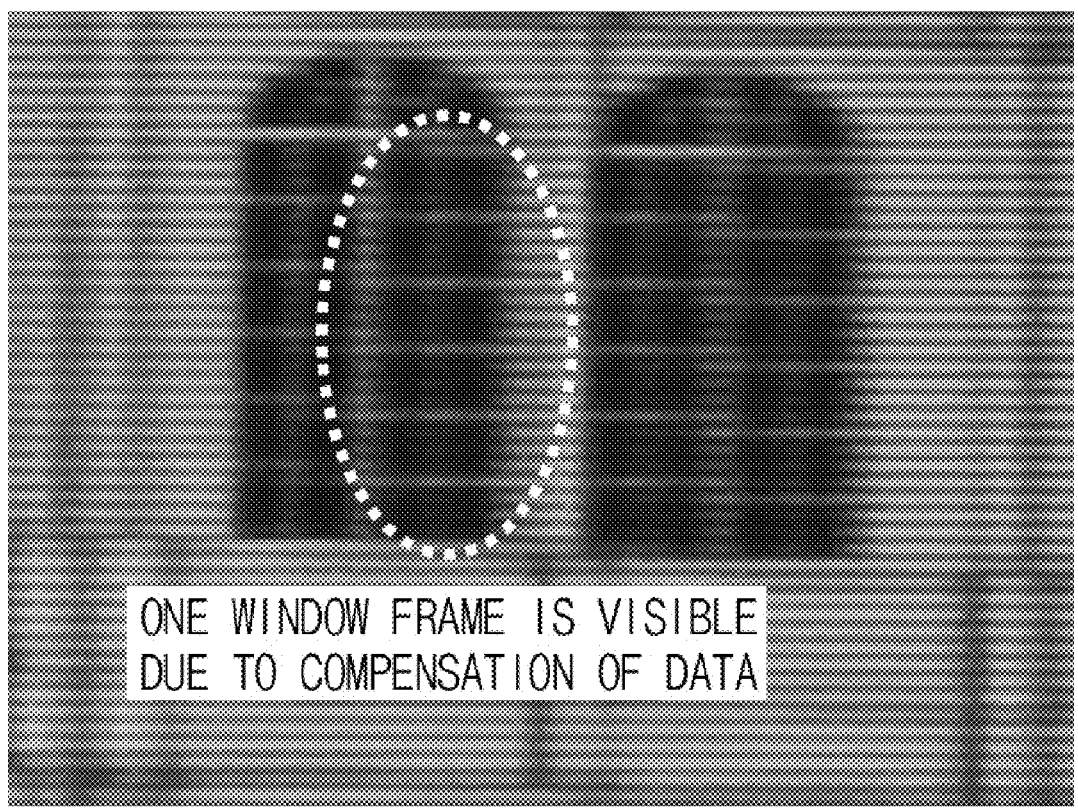
FIGS. 15 and 16 are diagrams illustrating test results of high resolution 3D image as shown in FIG. 8.
Figure 16:
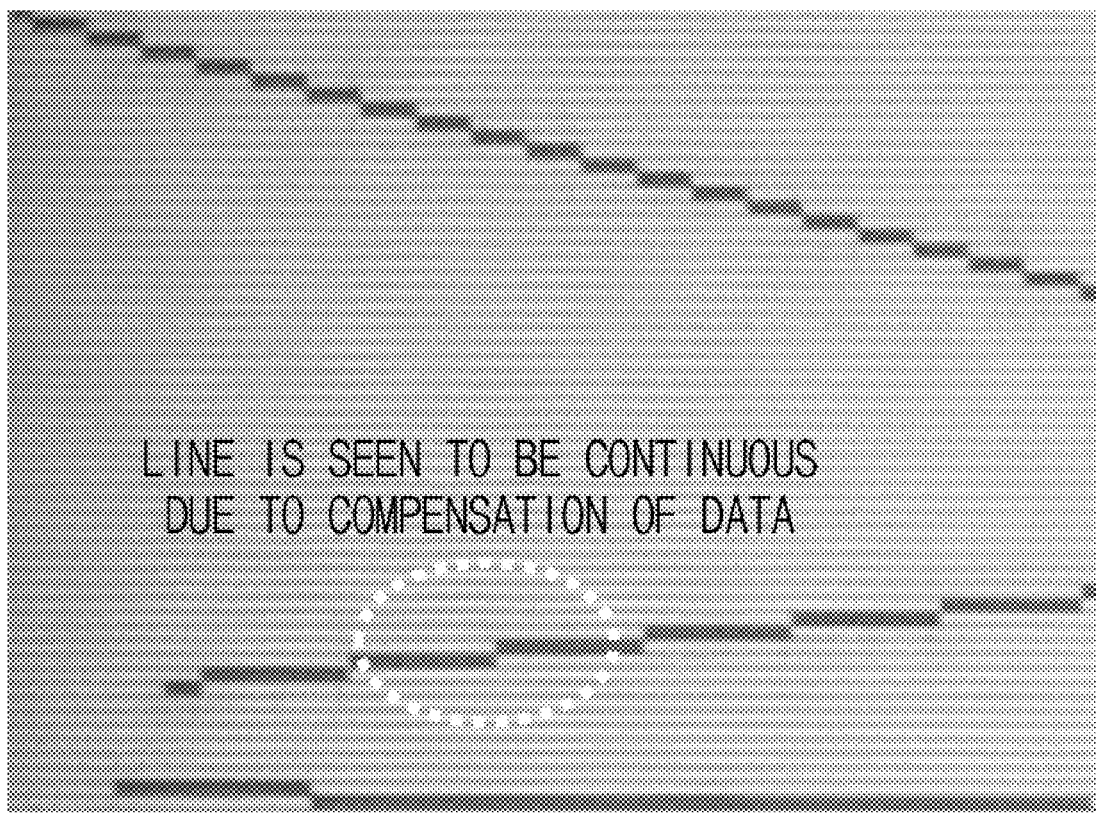

FIGS. 13 and 14 are diagrams illustrating test results of the low resolution 3D images as shown in FIG. 1. FIGS. 15 and 16 are diagrams illustrating test results of the high resolution 3D images as shown in FIG. 8. The same test images were input to the stereoscopic image display device in the related art and the stereoscopic image display device in this document both of which use the patterned retarder, and display screens were photographed in a state of wearing polarization glasses. As a result, as shown in FIG. 1, when the 3D input images of 50% resolution are displayed on the display panel 100 to which the patterned retarder is attached, there is no data with line units, and thus, as marked with the dotted circles in FIGS. 13 and 14, the pictures for the test images are seen to be cut partially. On the other hand, as a result of displaying the same test images on the stereoscopic image display device in this document, the invisible parts in the case of the related art were visible as shown in FIGS. 15 and 16 by adding the right eye and left eye compensation image data for the display lines for which there is no input image data, through the signal interpolation method, and thus by increasing the resolution regarding the 3D images viewed by a viewer due to temporal and spatial average effects. The stereoscopic image display device used in the test is a liquid crystal module of the stereoscopic image display device as shown in FIG. 2, which was manufactured in the present Applicant, has a resolution of 1920×1080 as the size of 47".

In the stereoscopic image display device in this document, the display device is not limited to the LCD. For example, the display panel 100 and the backlight unit may be replaced with a flat display device such as a field emission display (FED), a plasma display panel (PDP), an electroluminescence device (EL) including inorganic electroluminescence device and an organic light emitting diode (OLED) display, an electrophoresis display (EPD), or the like. The embodiments of this document will be described by exemplifying the LCD.

As described above, according to this document, it is possible to increase the resolution when the 3D images are displayed on the stereoscopic image display device by writing 3D image data in all the pixels of the stereoscopic image display device including the patterned retarder every frame period.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
a display panel provided with data lines and gate lines which intersect each other, and pixels arranged in a matrix;
a patterned retarder including first retarders transmitting a first polarization light from odd numbered display lines of the display panel and second retarders transmitting a second polarization light from even numbered display lines;
polarization glasses including a first polarization filter transmitting the first polarization light from the first retarders and a second polarization filter transmitting the second polarization light from the second retarders; and
a resolution converter configured to generate right eye compensation image data based on right eye image data input during a (N−1)-th (where N is a positive integer) frame period and to insert the right eye compensation image data between left eve image data input during a N-th frame period, and generate left eye compensation image data based on the left eye image data input during the N-th frame period and to insert the left eye compensation image data between right eye image data input during a (N+1)-th frame period, thereby increasing a resolution of input images,
wherein in the odd numbered display lines of the display panel, the left eye image data input during the N-th frame period is displayed during the N-th frame period, and the left eye compensation image data generated based on the left eye image data input during the N-th frame period is displayed during the (N+1)-th frame period, and
wherein in the even numbered display lines, the right eye compensation image data generated based on the right eye image data input during the (N−1)-th frame period is displayed during the N-th frame period, and the right eye image data input during the (N+1)-th frame period is displayed during the (N+1)-th frame period.

2. The stereoscopic image display device of claim 1, further comprising:
a data driving circuit configured to supply data voltages for data of which the resolution is converted by the resolution converter to the data lines; and
a gate driving circuit configured to sequentially supply gate pulses synchronized with the data voltages to the gate lines.

3. The stereoscopic image display device of claim 1, wherein the display panel includes pixels, disposed in each display line, each having a red sub-pixel, a green sub-pixel, and a blue sub-pixel,
wherein each of the sub-pixels includes a pixel electrode and a TFT, and wherein 2D image data is written in the pixels in a 2D mode, and 3D image data including the left eye image data, the left eye compensation image data, the right eye image data, and the right eye compensation image data is written in the pixels in a 3D mode.

4. The stereoscopic image display device of claim 1, wherein each of the pixels has a red sub-pixel, a green sub-pixel, and a blue sub-pixel, wherein each of the sub-pixels is divided into a main sub-pixels and an auxiliary sub-pixels, wherein the main sub-pixel includes a main pixel electrode and a first TFT and the auxiliary sub-pixel includes an auxiliary sub-pixel and a second TFT, wherein 2D image data is written in the main sub-pixel in a 2D mode, and 3D image data including the left eye image data, the left eye compensation image data, the right eye image data, and the right eye compensation image data is written in the main sub-pixel in a 3D mode, and wherein the 2D image data is written in the auxiliary sub-pixel in the 2D mode, and black data is written in the auxiliary sub-pixel in the 3D mode.

5. The stereoscopic image display device of claim 2, wherein the data driving circuit receives 3D image data including the left eye image data, the left eye compensation image data, the right eye image data, and the right eye compensation image data at a frame frequency of a multiple i (where i is an integer more than 2) of an input frame frequency.

6. The stereoscopic image display device of claim 1, wherein the display panel is a display panel of one display device of a liquid crystal display, a field emission display, a plasma display panel, an electroluminescence device, and an electrophoresis display.

7. A driving method of a stereoscopic image display device having a display panel provided with data lines and gate lines which intersect each other, and pixels arranged in a matrix; a patterned retarder including first retarders transmitting a first polarization light from odd numbered display lines of the display panel and second retarders transmitting a second polarization light from even numbered display lines; and polarization glasses including a first polarization filter transmitting the first polarization light from the first retarders and a second polarization filter transmitting the second polarization light from the second retarders, the driving method comprising:

generating right eye compensation image data based on right eye image data input during a (N−1)-th (where N is a positive integer) frame period and inserting the right eye compensation image data between left eye image data input during a N-th frame period, and generating left eye compensation image data based on the left eye image data input during the N-th frame period and inserting the left eye compensation image data between right eye image data input during a (N+1)-th frame period, thereby increasing a resolution of input images;

displaying the left eye image data input during the N-th frame period in the odd numbered display lines of the display panel during the N-th frame period, and displaying the right eye compensation image data generated based on the right eye image data input during the (N−1)-th frame period in the even numbered display lines of the display panel during the N-th frame period; and displaying the left eye compensation image data generated based on the left eye image data input during the N-th frame period in the odd numbered display lines of the display panel during the (N+1)-th frame period and displaying the right eye image data input during the (N+1)-th frame period in the even numbered display lines of the display panel during the (N+1)-th frame period.

8. The driving method of claim 7, further comprising:

supplying data voltages for data of which the resolution is converted to the data lines; and sequentially supplying gate pulses synchronized with the data voltages to the gate lines.

* * * * *